US011950073B2

(12) United States Patent
Shao

(10) Patent No.: US 11,950,073 B2
(45) Date of Patent: Apr. 2, 2024

(54) COAXIAL SPEAKER

(71) Applicant: AAC Microtech (Changzhou) Co., Ltd., Changzhou (CN)

(72) Inventor: Tao Shao, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 157 days.

(21) Appl. No.: 17/840,574

(22) Filed: Jun. 14, 2022

(65) Prior Publication Data

US 2023/0239622 A1 Jul. 27, 2023

(30) Foreign Application Priority Data

Jan. 25, 2022 (CN) ......................... 202210085715.6

(51) Int. Cl.

| | |
|---|---|
| ***H04R 9/02*** | (2006.01) |
| ***H04R 7/12*** | (2006.01) |
| ***H04R 7/16*** | (2006.01) |
| ***H04R 9/04*** | (2006.01) |
| ***H04R 9/06*** | (2006.01) |

(52) U.S. Cl.

CPC ............. *H04R 9/025* (2013.01); *H04R 7/127* (2013.01); *H04R 7/16* (2013.01); *H04R 9/045* (2013.01); *H04R 9/06* (2013.01); *H04R 2400/11* (2013.01)

(58) Field of Classification Search

CPC ........ H04R 9/063; H04R 9/045; H04R 9/025; H04R 31/006; H04R 2400/11; H04R 1/24; H04R 1/1058; H04R 1/102

See application file for complete search history.

(56) References Cited

U.S. PATENT DOCUMENTS

| | | | | |
|---|---|---|---|---|
| 7,519,191 B2 * | 4/2009 | Enomoto | H04R 9/045 | 381/186 |
| 2009/0136065 A1 * | 5/2009 | Yano | H04R 9/10 | 381/186 |
| 2011/0044491 A1 * | 2/2011 | Ku | H04R 9/06 | 381/433 |
| 2022/0174414 A1 * | 6/2022 | Yan | H04R 9/025 | |
| 2022/0210571 A1 * | 6/2022 | Zhou | H04R 7/18 | |

FOREIGN PATENT DOCUMENTS

CN 208874732 U * 5/2019

* cited by examiner

*Primary Examiner* — Sunita Joshi
(74) *Attorney, Agent, or Firm* — W&G Law Group

(57) ABSTRACT

The present invention provides a coaxial speaker, which includes a frame, a vibration system and a magnetic circuit system. The magnetic circuit system includes a magnetic conduction assembly and a magnet assembly. The magnetic conduction assembly includes a first magnetic conduction plate, an inner side wall and an outer side wall, and a second magnetic conduction plate fixed on the side of the inner side wall. The magnet assembly includes a first magnet that forms a first magnetic gap and a second magnet that forms a second magnetic gap, a first vibration assembly and a second vibration assembly. The present invention is provided with high internal space integration, high magnetic circuit utilization, and meets the requirements of the full frequency domain.

10 Claims, 5 Drawing Sheets

C-C

D-D

COAXIAL SPEAKER

FIELD OF THE PRESENT DISCLOSURE

The invention relates to the technical field of electro-acoustic transducers, in particular to coaxial speaker.

DESCRIPTION OF RELATED ART

A coaxial speaker refers to a speaker that integrates a treble speaker unit and a bass speaker unit, and the treble speaker unit and the bass speaker unit are coaxially arranged. The sound sources of the high-pitched speaker unit and the bass speaker unit of the coaxial speaker are both located on the front surface of the coaxial speaker, that is, the sound directions of the two speaker units are the same.

The high-pitched speaker unit and the low-frequency speaker unit of the coaxial speaker in the related art each include an independent vibration system and a magnetic circuit system, and the structure is complex. The overall height of the coaxial speaker composed of the tweeter speaker unit and the bass speaker unit coaxially increases, which leads to inconvenient installation due to the high height and reduces the applicability of the product. In addition, the separate high-low and low-frequency magnetic circuit also increases the production cost and reduces the market competitiveness of the product. Moreover, in the related art, the effective area of the vibration diaphragm in the speaker unit that is away from the sound outlet surface is limited, which cannot meet the requirements of the full sound range.

Therefore, it is necessary to provide a coaxial speaker that is highly integrated in space and meets the requirements of the full range.

SUMMARY OF THE PRESENT INVENTION

The purpose of the present invention is to provide a coaxial speaker which effectively improves the space utilization rate inside the coaxial speaker and is beneficial to control the overall height of the product.

Accordingly, the present invention provides a coaxial speaker comprising: a frame; a vibration system supported by the frame; a magnetic circuit system fixed to the frame, including a magnetic conduction assembly fixed to the frame, and a magnet assembly fixed to the magnetic conduction assembly; a ring-shaped first magnetic conduction plate formed by the magnetic conduction assembly; an inner side wall fixed to the first magnetic conduction plate; an outer side wall surrounding the inner side wall; and a second magnetic conduction plate fixed at an end of the inner side wall away from the first magnetic conduction plate.

The magnet assembly includes a first magnet fixed on a side of the second magnetic conduction plate facing the inner side wall; a second magnet fixed on the side of the second magnetic conduction plate away from the inner side wall; a first magnetic gap formed by the first magnet and the inner side wall; and a second magnetic gap formed by the inner side wall, the second magnetic conduction plate and the second magnet.

The vibration system includes a first vibration assembly having a first diaphragm fixed on the frame and a first voice coil fixed on the first diaphragm and at least partially inserted into the first magnetic gap, and a second vibration assembly spaced apart from the first vibration assembly, including a second diaphragm and a second voice coil fixed to the second diaphragm and at least partially inserted into the second magnetic gap. The vibration system further includes a first opening formed in the frame; and a second opening formed in the frame and spaced from the first opening along a vibration direction.

The second diaphragm is fixed on the frame and covers the second opening, and when the second diaphragm vibrates, sound waves are exported to outside through the first opening.

As an optional improvement of the present invention as described above, the coaxial speaker further includes a support component for supporting the magnetic circuit system in the frame; wherein the support component includes a support body fixed on the outer side wall and a plurality of spaced supporting beams extending from the support body to the frame.

As an optional improvement of the present invention as described above, the first diaphragm includes a first dome at a middle position and a first suspension surrounding the first dome; the outer edge of the first suspension is fixed on the side of the first magnetic conduction plate away from the outer side wall.

As an optional improvement of the present invention as described above, the first dome is convex along the vibration direction and away from the first magnet, and the cross section of the first dome along the vibration direction is arc shape.

As an optional improvement of the present invention as described above, the first vibration assembly further includes a first bracket fixed to the first suspension inner edge, the first voice coil is inserted into the first magnetic gap through the first bracket.

As an optional improvement of the present invention as described above, the second diaphragm includes a second dome located in the middle position and a second suspension surrounding the second dome; the outer edge of the second suspension is fixed on the frame; the second dome includes a central dome part in the middle position and in the shape of a flat plate, and an extension part extending outward from the edge of the central dome part to the inner edge fixed on the second suspension; the central dome part is in the shape of a flat plate, and the second voice coil is fixed on the central dome part.

As an optional improvement of the present invention as described above, a projection of the first diaphragm along the vibration direction falls into the central dome part.

As an optional improvement of the present invention as described above, a projection of the outer side wall along the vibration direction falls into the central dome part.

As an optional improvement of the present invention as described above, the second vibration assembly includes a second bracket fixed to the central dome part, and the second voice coil is inserted into the second magnetic gap through the second bracket.

As an optional improvement of the present invention as described above, the magnetic conduction assembly further includes a third magnetic conduction plate fixed on the side of the first magnet facing the first diaphragm and a fourth magnetic conduction plate fixed on the side of the second magnet facing the second diaphragm.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
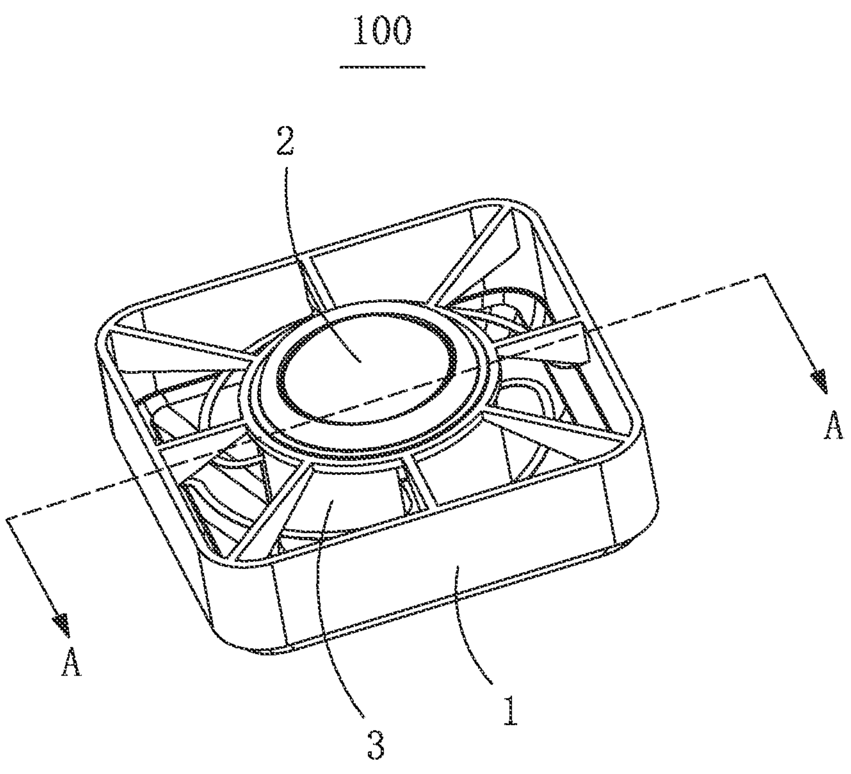
FIG. 1 is an isometric view of a coaxial speaker in accordance with an embodiment of the present invention.
Figure 2:
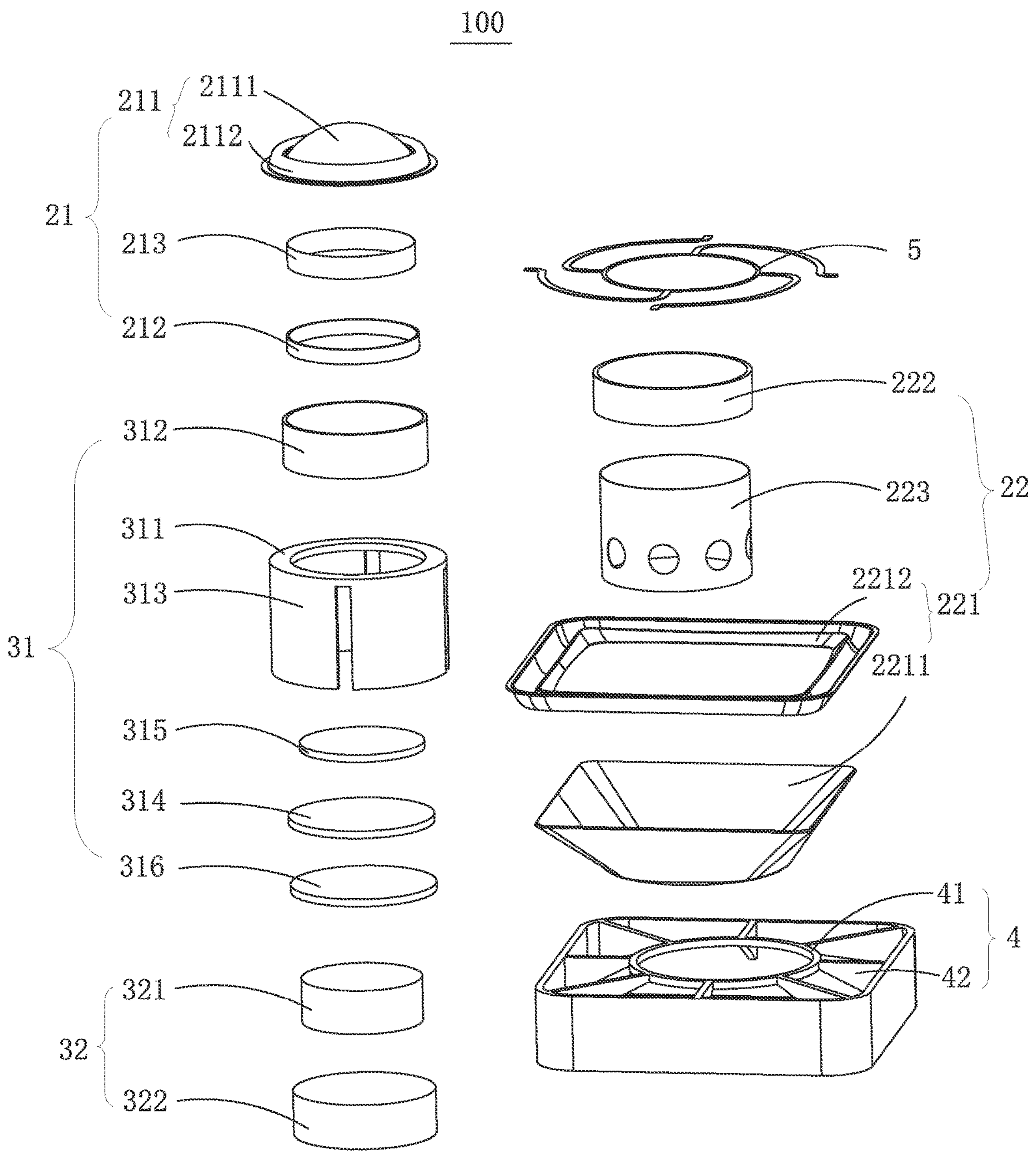
FIG. 2 is an exploded view of the coaxial speaker in FIG. 1.
Figure 3:
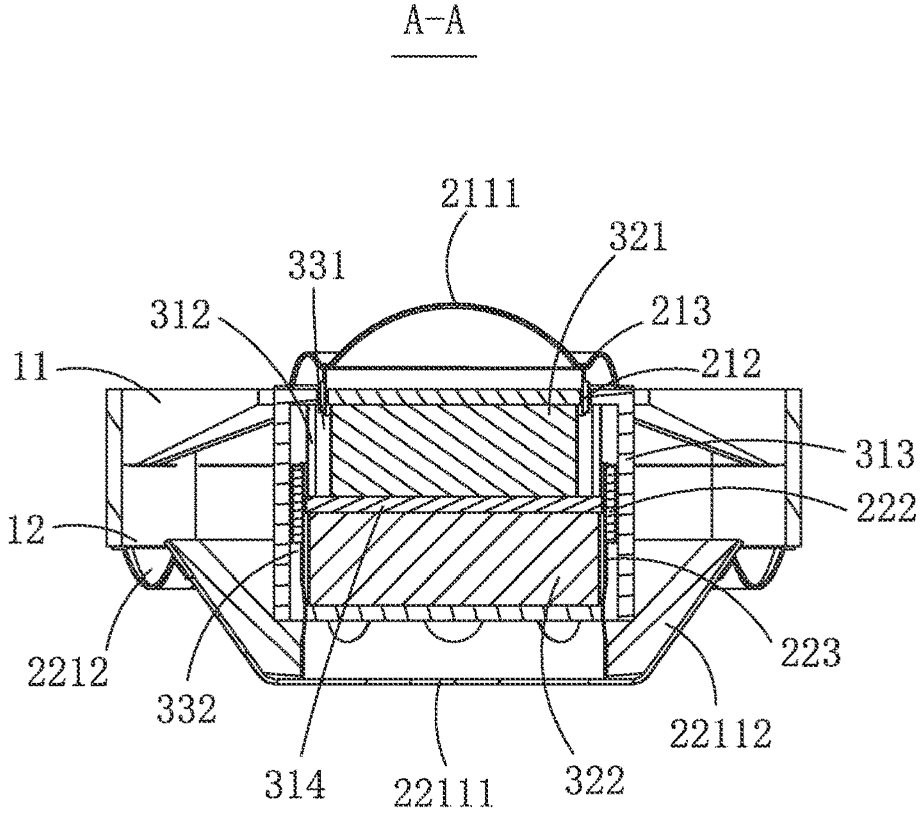
FIG. 3 is a cross-sectional view of the coaxial speaker taken along line AA in FIG. 1.
Figure 4:
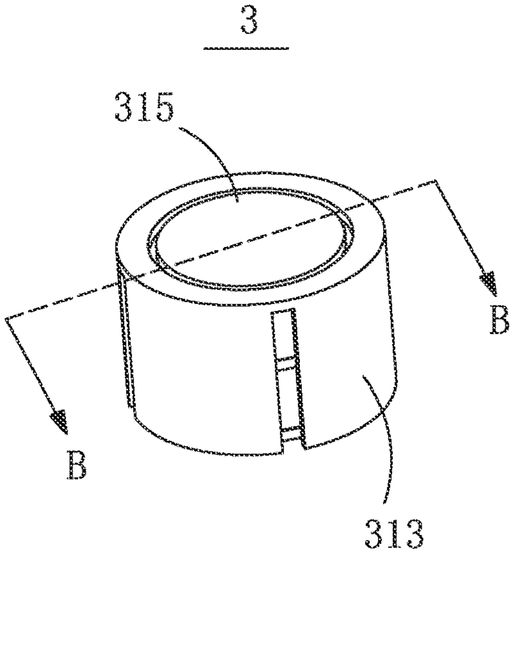
FIG. 4 is an isometric view of a magnetic circuit system of the coaxial speaker.
Figure 5:
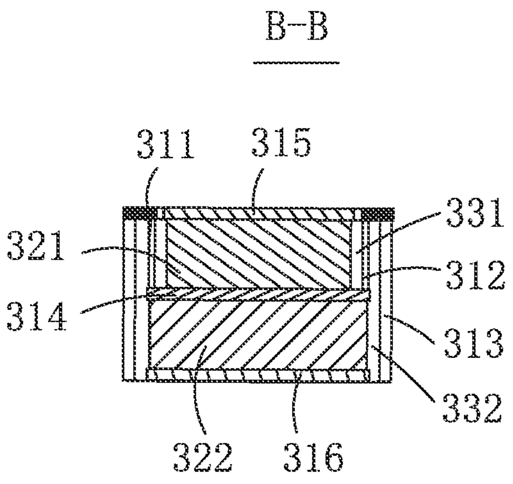
FIG. 5 is a cross-sectional view of the coaxial speaker taken along line BB in FIG. 4.
Figure 6:
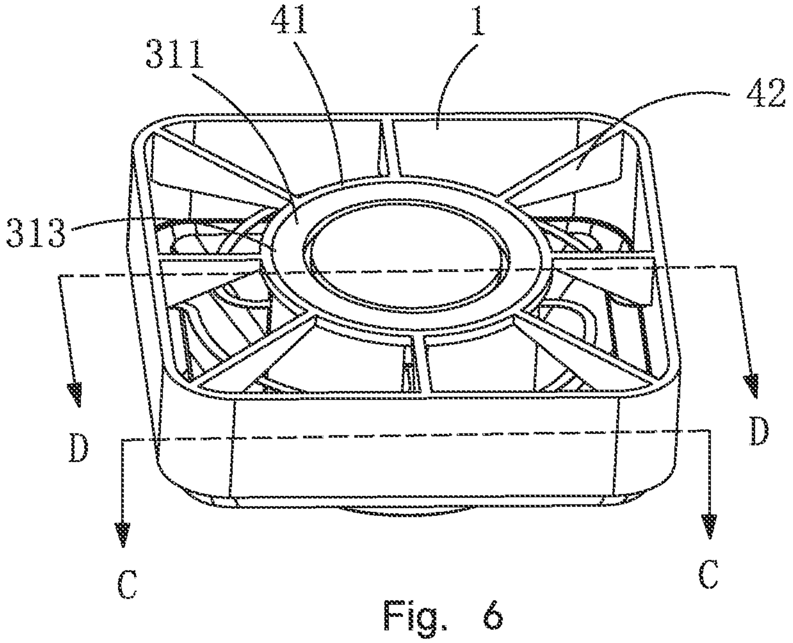
FIG. 6 is an isometric view of a part of the coaxial speaker.
Figure 7:
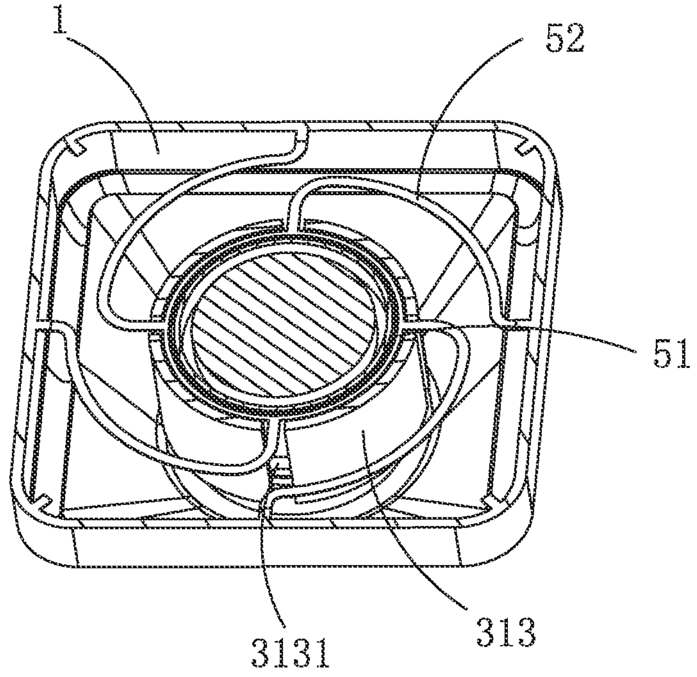
FIG. 7 is a cross-sectional view of the coaxial speaker taken along line CC in FIG. 6.
Figure 8:
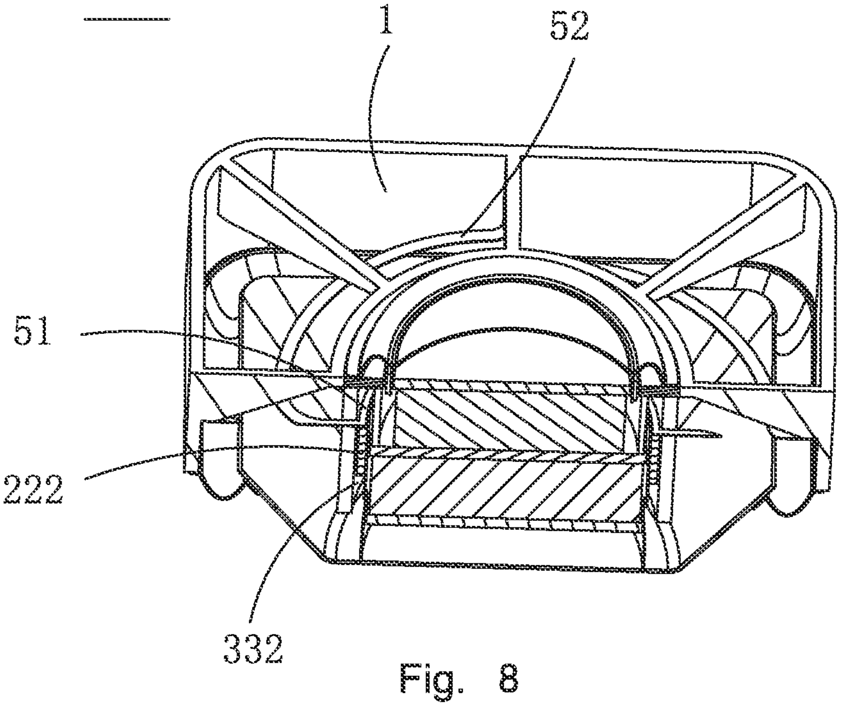
FIG. 8 is a sectional view of the coaxial speaker taken along line DD in FIG. 6.

As shown in FIGS. 1-8, the present invention provides a coaxial speaker 100, the coaxial speaker 100 includes a frame 1, a vibration system 2 and a magnetic circuit system 3 fixed to the frame 1. Wherein, the magnetic circuit system 3 drives the vibration system 2 to vibrate and sound.

The magnetic circuit system 3 includes a magnetic conduction assembly 31 fixed to the frame 1 and a magnet assembly 32 fixed to the magnetic conduction assembly 31. Specifically, the magnetic conduction assembly 31 includes a first magnetic conduction plate 311 in a ring shape, an inner side wall 312 fixed to the first magnetic conduction plate 311, an outer side wall 313 spaced around the inner side wall 312, and a second magnetic conduction plate 314 fixed on the inner side wall 312 away from the first magnetic conduction plate 311. It should be noted that both the inner side wall 312 and the outer side wall 313 are annular structures and extend along the vibration direction. The inner side wall 312 is a structure with openings at both ends, the second magnetic conduction plate 314 is fixed on the inner side wall 314 and covers the opening at one end away from the first magnetic conduction plate 311; further, the first magnetic conduction plate 311, the inner side wall 312 and the outer side wall 313 are concentric ring structure. In this embodiment, the outer edge of the first magnetic conduction plate 311 is bent and extended to form a outer side wall 313. The magnet assembly 32 includes a first magnet 321 fixed on the side of the second magnetic conduction plate 314 facing the inner side wall 312 and a second magnet 322 fixed on the side of the second magnetic conduction plate 314 away from the inner side wall 312. The first magnet 321 and the inner side wall 312 are spaced apart to form a first magnetic gap 331. Due to the vibration direction, the inner side wall 312, the second magnetic conduction plate 314 and the second magnet 322, which are stacked in sequence, are spaced apart from the outer side wall 313 to form a second magnetic gap 332. With this arrangement, the first voice coil 212 and the second voice coil 222 share a magnetic circuit, which further reduces the production cost.

The vibration system 2 includes a first vibration assembly 21 and a second vibration assembly 22 spaced apart from each other. The first vibration assembly 21 includes a first diaphragm 211 fixed to the frame 1 and a first voice coil 212 fixed to the first diaphragm 211 and inserted into the first magnetic gap 331. The second vibration assembly 22 includes a second diaphragm 221 fixed to the frame 1 and a second voice coil 222 fixed to the second diaphragm 221 and inserted into the second magnetic gap 332. After the first voice coil 212 is energized, it drives the first diaphragm 211 to vibrate and produce sound, and when the second voice coil 222 is energized, it drives the second diaphragm 221 to vibrate and produce sound.

Specifically, the frame 1 also is arranged with a circular structure, so the frame 1 includes a first opening 11 and a second opening 12 located at both ends along the vibration direction. In this embodiment, the second diaphragm 221 is fixed to the frame 1 and covers the second opening 12, and. When the second diaphragm 221 vibrates, the sound waves are exported to the outside through the first opening 11. In this embodiment, the first diaphragm 211 and the second diaphragm 221 are structures that sound from the same side.

Further, the first diaphragm 211 includes a first dome 2111 located in the middle and a first suspension 2112 surrounding the first dome 2111. the outer edge of the first suspension 2112 is fixed to the surface of the first magnetic conduction plate 311 away from the outer side wall 313. The first dome 2111 is convex along the vibration direction and away from the first magnet 321, and the cross section of the first dome 2111 along the vibration direction is arc-shaped. The second diaphragm 221 includes a second dome 2211 in the middle and a second suspension 2212 surrounding the second dome 2211.

The outer edge of the second suspension 2212 is fixed to the frame 1. The second dome 2211 includes a central dome part 22111 located in the middle and in the shape of a flat plate, and an extension part 22112 extending outward from the edge of the central dome part 22111 until fixed to the inner edge of the second suspension 2212. The central dome part 22111 is arranged with a flat plate shape, and the second voice coil 222 is fixed to the central dome part 22111. In order to enhance the magnetic field performance of the magnetic circuit system 3, the projection of the first magnet 321 along the vibration direction falls into the central dome part 22111.

Further, the first vibration assembly 21 further includes a first bracket 213 fixed on the inner edge of the first suspension 2112, and the first voice coil 212 is inserted into the first magnetic gap 331 through the first bracket 213. The second vibration assembly 22 includes a second bracket 223 fixed to the central dome part 22211, and the second voice coil 222 is inserted into the second magnetic gap 332 through the second bracket 223.

Specifically, the coaxial speaker 100 further includes a support component 4 that supports the magnetic circuit system 3 in the frame 1. The support component 4 includes a support body 41 fixed on the outer side wall 313 and a plurality of supporting beams 42 extending from the support body 41 to the frame 1, and the supporting beams 42 are arranged at intervals. It can be understood that the support body 41 is in the shape of a circular ring, and the ring is arranged on the outer side wall 313 on the outer side. Several supporting beams 42 thereof are arranged at intervals along the circumferential direction of the support body 41. Therefore, the supporting beams 42 are spaced apart from each other, leaving a sound conduction channel, so that the sound waves generated by the vibration of the second diaphragm 221 can be exported to the outside world through the first opening 11.

In order to make the second voice coil 222 more stably supported in the second magnetic gap 332, the coaxial speaker 100 in the present invention further includes a third bracket 5. Specifically, the third bracket 5 includes a bracket body 51 fixed to the second voice coil 222 and a support arm 52 extending from the bracket body 51 to the frame 1. As can be seen from FIG. 6-FIG. 8, the outer side wall 313 is provided with an avoidance slot 3131 connecting the second magnetic gap 332 with the internal space of the frame 1, and the support arm 52 is connected to the second voice coil 222 through the avoidance slot 3131.

In order to make the sound waves generated by the second diaphragm 221 have sufficient space to be led out from the first opening 11, in the present invention, the projection of the first diaphragm 211 along the vibration direction falls into the central dome part 22111 of the second diaphragm 221. That is, the area of the first diaphragm 211 is set to be significantly smaller than the second diaphragm 221 so that a sufficient distance exists between the first diaphragm 211 and the frame 1. Further, the projection of the outer side wall 313 along the vibration direction falls into the central dome part 22111.

In order to enhance the utilization of the magnetic field of the magnetic circuit system 3, the magnetic conduction assembly 31 further includes a third magnetic conduction plate 315 fixed on the side of the first magnet 321 facing the first diaphragm 211 and a fourth magnetic conduction plate 316 fixed on the side of the second magnet 322 facing the second diaphragm 221. Make the magnetic circuit form a self-closing cycle, and achieve high-efficiency magnetic circuit utilization.

The coaxial speaker of the present invention includes a frame, a vibration system and a magnetic circuit system fixed to the frame. The magnetic circuit system includes a magnetic conduction assembly and a magnet assembly fixed to the frame. The magnetic conduction assembly includes a first magnetic conduction plate in a ring shape, an inner side wall and an outer side wall that are both fixed to the first magnetic conduction plate and arranged at intervals, and a second magnetic conduction plate that is fixed at one end of the inner side wall away from the first magnetic conduction plate.

The magnet assembly includes a first magnet that is fixed to the second magnetic conduction plate and forms a first magnetic gap with the inner side wall, and a second magnet that is fixed to the second magnetic conduction plate and forms a second magnetic gap with the outer side wall. The vibration system includes a first vibration assembly and a second vibration assembly spaced apart from each other. The first vibration assembly includes a first diaphragm fixed to the frame and a first voice coil fixed to the first diaphragm and inserted into the first magnetic gap. The second vibration assembly includes a second diaphragm and a second voice coil fixed to the second diaphragm and inserted into the second magnetic gap. The first vibration assembly and the second vibration assembly share the same magnetic circuit system, which effectively improves the space utilization inside the coaxial speaker and helps control the overall height of the product.

Moreover, the magnetic conduction assembly in the present invention enables the magnetic circuit to form a self-closed loop, so as to achieve high-efficiency magnetic circuit utilization. The first diaphragm achieves high-frequency sound, and the second diaphragm achieves full-frequency sound, meeting the requirements of the full frequency domain.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker comprising:
a frame;
a vibration system supported by the frame;
a magnetic circuit system fixed to the frame, including a magnetic conduction assembly fixed to the frame, and a magnet assembly fixed to the magnetic conduction assembly;
a ring-shaped first magnetic conduction plate formed by the magnetic conduction assembly;
an inner side wall fixed to the first magnetic conduction plate;
an outer side wall surrounding the inner side wall;
a second magnetic conduction plate fixed at an end of the inner side wall away from the first magnetic conduction plate; wherein
the magnet assembly includes:
a first magnet fixed on a side of the second magnetic conduction plate facing the inner side wall;
a second magnet fixed on the side of the second magnetic conduction plate away from the inner side wall;
a first magnetic gap formed by the first magnet and the inner side wall;
a second magnetic gap formed by the inner side wall, the second magnetic conduction plate and the second magnet; and
the vibration system includes:
a first vibration assembly having a first diaphragm fixed on the frame and a first voice coil fixed on the first diaphragm and at least partially inserted into the first magnetic gap;
a second vibration assembly spaced apart from the first vibration assembly, including a second diaphragm and a second voice coil fixed to the second diaphragm and at least partially inserted into the second magnetic gap;
a first opening formed in the frame;
a second opening formed in the frame and spaced from the first opening along a vibration direction; and wherein
the second diaphragm is fixed on the frame and covers the second opening, and when the second diaphragm vibrates, sound waves are exported to outside through the first opening.

2. The coaxial speaker as described in claim 1, further including a support component for supporting the magnetic circuit system in the frame; wherein the support component includes a support body fixed on the outer side wall and a plurality of spaced supporting beams extending from the support body to the frame.

3. The coaxial speaker as described in claim 1, wherein the first diaphragm includes a first dome at a middle position and a first suspension surrounding the first dome; the outer edge of the first suspension is fixed on the side of the first magnetic conduction plate away from the outer side wall.

4. The coaxial speaker as described in claim 3, wherein the first dome is convex along the vibration direction and away from the first magnet, and the cross section of the first dome along the vibration direction is arc shape.

5. The coaxial speaker as described in claim 3, wherein the first vibration assembly further includes a first bracket fixed to the first suspension inner edge, the first voice coil is inserted into the first magnetic gap through the first bracket.

6. The coaxial speaker as described in claim 1, wherein the second diaphragm includes a second dome located in the middle position and a second suspension surrounding the second dome; the outer edge of the second suspension is fixed on the frame; the second dome includes a central dome part in the middle position and in the shape of a flat plate, and an extension part extending outward from the edge of the central dome part to the inner edge fixed on the second suspension; the central dome part is in the shape of a flat plate, and the second voice coil is fixed on the central dome part.

7. The coaxial speaker as described in claim 6, wherein a projection of the first diaphragm along the vibration direction falls into the central dome part.

8. The coaxial speaker as described in claim 6, wherein a projection of the outer side wall along the vibration direction falls into the central dome part.

9. The coaxial speaker as described in 8, wherein the second vibration assembly includes a second bracket fixed to the central dome part, and the second voice coil is inserted into the second magnetic gap through the second bracket.

10. The coaxial speaker as described in claim 1, wherein the magnetic conduction assembly further includes a third magnetic conduction plate fixed on the side of the first magnet facing the first diaphragm and a fourth magnetic conduction plate fixed on the side of the second magnet facing the second diaphragm.

* * * * *